United States Patent
Sutton et al.

(10) Patent No.: US 12,461,675 B1
(45) Date of Patent: Nov. 4, 2025

(54) COMPARISON OF A FINGERPRINT GENERATED FOR A REALIGNED DATA PAGE THAT BEGINS AT A NON-ZERO VALUE PORTION TO A PLURALITY OF FINGERPRINTS OF A DEDUPLICATION STORAGE SYSTEM

(71) Applicant: HEWLETT PACKARD ENTERPRISE DEVELOPMENT LP, Spring, TX (US)

(72) Inventors: Christopher Robert Sutton, Boise, ID (US); Susan Agten, Boise, ID (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/751,612

(22) Filed: Jun. 24, 2024

(51) Int. Cl.
*G06F 3/06* (2006.01)
(52) U.S. Cl.
CPC .......... *G06F 3/0641* (2013.01); *G06F 3/0604* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 7,610,437 B2 * | 10/2009 | Sinclair | ................. | G06F 3/0652 711/104 |
| 7,984,084 B2 * | 7/2011 | Sinclair | ............... | G06F 16/1847 707/818 |
| 8,285,918 B2 * | 10/2012 | Maheshwari | ........ | G11C 7/1072 711/159 |
| 8,443,263 B2 * | 5/2013 | Selinger | .............. | G06F 11/1068 714/768 |
| 8,873,284 B2 * | 10/2014 | Sinclair | ............... | G06F 12/0246 365/185.11 |
| 9,223,693 B2 * | 12/2015 | Sinclair | ............... | G06F 12/0246 |
| 9,336,133 B2 * | 5/2016 | Sinclair | ............... | G06F 12/0246 |

(Continued)

OTHER PUBLICATIONS

Eshghi et al., "A Framework for Analyzing and Improving Content-Based Chunking Algorithms," Hewlett-Packard Labs Technical Report, TR 2005-30, Sep. 22, 2005, 11 pages.

(Continued)

*Primary Examiner* — Christopher D Birkhimer
(74) *Attorney, Agent, or Firm* — Trop, Pruner & Hu, P.C.

(57) ABSTRACT

Example implementations relate to deduplication operations in a storage system. An example implementation includes receiving a data page to be stored in a persistent storage of a deduplication storage system, and, in response to a determination that the data page includes the leading zero pad, performing a circular shift of the plurality of data blocks to generate a realigned data page that begins at a non-zero value portion. The example implementation further includes generating a fingerprint for the realigned data page, and comparing the generated fingerprint to a plurality of fingerprints included in metadata of the deduplication storage system. The example implementation further includes, in response to a determination that no matches are found between the generated fingerprint and the plurality of fingerprints included in the metadata, storing the realigned data page and the generated fingerprint in the persistent storage.

20 Claims, 15 Drawing Sheets

(56) References Cited

U.S. PATENT DOCUMENTS

| | | | |
|---|---|---|---|
| 9,348,746 B2* | 5/2016 | Sinclair | G06F 12/0246 |
| 9,465,731 B2* | 10/2016 | Sinclair | G06F 12/0246 |
| 9,652,382 B1* | 5/2017 | Subramanian | G06F 12/0253 |
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 10,108,543 B1* | 10/2018 | Duggal | G06F 11/14 |
| 10,108,544 B1* | 10/2018 | Duggal | G06F 11/14 |
| 10,120,613 B2* | 11/2018 | Sinclair | G06F 12/02 |
| 10,133,490 B2* | 11/2018 | Sinclair | G06F 3/0655 |
| 10,255,179 B2* | 4/2019 | Ji | G06F 3/0659 |
| 10,417,202 B2 | 9/2019 | Nazari et al. | |
| 10,430,279 B1* | 10/2019 | Dittia | G06F 3/0656 |
| 10,732,881 B1 | 8/2020 | Mayo et al. | |
| 10,739,996 B1* | 8/2020 | Ebsen | G06F 16/1727 |
| 10,795,812 B1* | 10/2020 | Duggal | G06F 3/067 |
| 10,983,715 B2* | 4/2021 | Sharoni | G06F 21/79 |
| 11,086,537 B2* | 8/2021 | Byun | G06F 12/0253 |
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0189477 A1* | 8/2008 | Asano | G06F 12/0246 |
| | | | 711/E12.008 |
| 2011/0145473 A1* | 6/2011 | Maheshwari | G11C 7/1072 |
| | | | 711/E12.008 |
| 2011/0153700 A1* | 6/2011 | Gopal | G06F 9/30036 |
| | | | 708/209 |
| 2011/0161784 A1* | 6/2011 | Selinger | G06F 11/1016 |
| | | | 714/E11.002 |
| 2012/0023112 A1* | 1/2012 | Levow | G06F 21/564 |
| | | | 711/E12.007 |
| 2013/0073529 A1* | 3/2013 | Aronovich | G06F 3/0641 |
| | | | 707/E17.005 |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2014/0380471 A1* | 12/2014 | Levow | H04L 63/1408 |
| | | | 726/23 |
| 2015/0227602 A1* | 8/2015 | Ramu | G06F 11/1456 |
| | | | 707/634 |
| 2016/0246713 A1* | 8/2016 | Choi | G06F 3/0608 |
| 2017/0038978 A1* | 2/2017 | Li | G06F 3/0611 |
| 2017/0123655 A1* | 5/2017 | Sinclair | G06F 3/061 |
| 2017/0242790 A1* | 8/2017 | O'Krafka | G06F 3/0652 |
| 2018/0189175 A1* | 7/2018 | Ji | G06F 3/0679 |
| 2019/0235778 A1* | 8/2019 | Jin | H04L 67/1097 |
| 2020/0089420 A1* | 3/2020 | Sharoni | G06F 21/79 |
| 2020/0134051 A1* | 4/2020 | Alkalay | G06F 3/0608 |
| 2020/0192794 A1* | 6/2020 | Lee | G06F 3/0653 |
| 2020/0218653 A1* | 7/2020 | Ryu | G06F 12/0253 |
| 2020/0310686 A1* | 10/2020 | Truong | G06F 3/061 |
| 2021/0182077 A1* | 6/2021 | Chen | G06F 40/263 |
| 2021/0342362 A1* | 11/2021 | Haravu | G06F 11/1464 |
| 2021/0389904 A1* | 12/2021 | Lee | G06F 3/0679 |
| 2021/0406216 A1* | 12/2021 | Komatsu | G06F 16/11 |
| 2024/0202114 A1* | 6/2024 | Tang | G06F 12/0246 |

OTHER PUBLICATIONS

Juan Pablo Carzolio, "A Guide to Consistent Hashing," accessed Nov. 14, 2023, <https://www.toptal.com/big-data/consistent-hashing>, 37 pages.

Wikipedia, "Circular buffer," Nov. 7, 2023, <https://en.wikipedia.org/w/index.php?title=Circular_buffer&oldid=1183977321>, 6 pages.

* cited by examiner

COMPARISON OF A FINGERPRINT GENERATED FOR A REALIGNED DATA PAGE THAT BEGINS AT A NON-ZERO VALUE PORTION TO A PLURALITY OF FINGERPRINTS OF A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
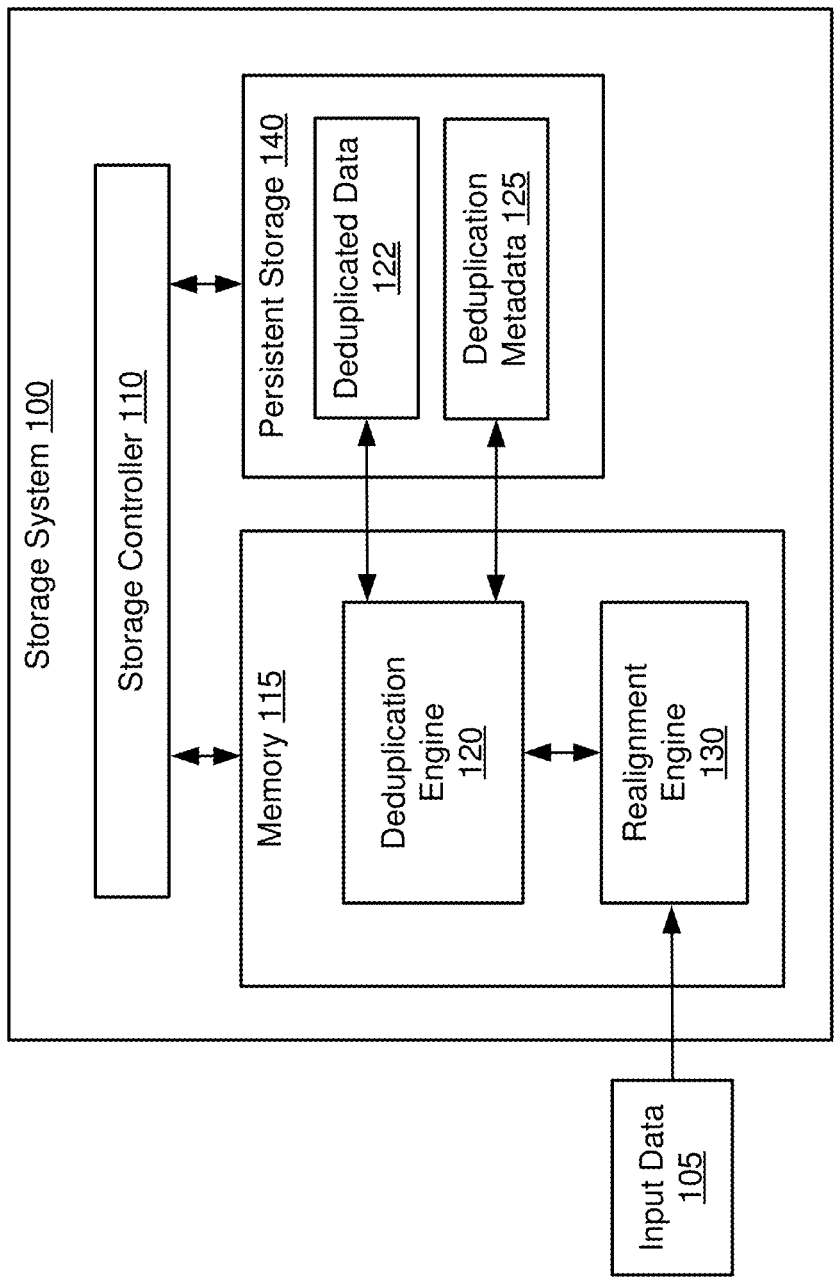
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data in deduplicated form, thereby reducing the amount of storage space required to store the data. For example, the storage system may receive or read input data pages that each include the same number of discrete data unit (or "blocks"), and may determine "fingerprints" (described below) for these input data pages. Further, the storage system may compare the fingerprints of input data pages to fingerprints of stored data pages, and may thereby determine which input data pages are duplicates of previously stored data pages (e.g., when the comparison indicates matching fingerprints). In the case of data pages that are duplicates, the storage system may store references to previously stored data pages instead of storing the duplicate input data pages.

As used herein, the term "fingerprint" refers to a value derived by applying a function on the content of the data page (where the "content" can include the entirety or a subset of the content of the data pages). An example of a function that can be applied includes a hash function that produces a hash value based on the content of a set of data blocks included in an input data page. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

As used herein, a "storage system" can refer to a storage device or an array of storage devices. A storage system may also include storage controller(s) that manage(s) access of the storage device(s). A "data block" can refer to any portion of data that can be separately identified in the storage system. Each data block may encode or represent a particular data value. For example, a data block may include one or more bytes, with each byte representing a particular character (e.g., number, letter, symbol, etc.) in the American Standard Code for Information Interchange (ASCII) encoding. Further, if each byte in the data block encodes a zero (or null) value, the data block may be referred to herein as a "zero value data block."

As used herein, a "data page" can refer to a data object that includes a specified or fixed number of data blocks. In some examples, the data blocks may be arranged in a sequence (also referred to herein as the "block order") from the beginning of the data page (e.g., the first or initial data block position in the data page) to the end of the data page (e.g., the last of final data block position in the data page). For example, each 16 kilobyte (KB) data page may include thirty-two data blocks that each include 512 bytes, and that are ordered from block position 1 to block position 32. In some examples, a storage system may store data pages in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing input data pages. Such metadata may include data representations that record the order or arrangement of a collection of data pages. For example, a data representation may record the location or address (e.g., storage address, memory address, etc.) at which each data page is stored. In another example, a data representation of an inbound data stream (also referred to as a "stream representation") may record the sequential order in which a set of data pages are received in the data stream. The stream representation may include a sequence of page references, with each page reference representing a particular inbound data page. Each page reference may include a pointer to the storage location of the referenced data page. Subsequently, in response to a read request, the deduplication system may use a stored data representation to recreate the original data collection.

In some examples, upon receiving or reading a data page, a fingerprint of the data page may be matched against fingerprints stored in deduplication metadata to determine whether an identical data page is already stored in the deduplication storage. If no matching fingerprints are found in the deduplication metadata, the data page may be stored in the deduplication storage, and a page reference for the data page may be added to the data representation in the deduplication metadata. However, if a matching fingerprint is found in the deduplication metadata, it may be determined that a data page identical to the received data page is already stored in the deduplication storage. In response to this determination, the data page is not stored in the deduplication storage (as an identical copy is already present in the deduplication storage), thereby avoiding storing a duplicate data page in the deduplication storage.

In some examples, a data page may have different sections or portions that include different types of data blocks. For example, the data page may include a first portion (referred to herein as a "zero value portion" or a "zero pad") that consists solely of zero value data blocks. Further, the data page may also include a second portion (referred to herein as a "non-zero value portion") that does not consist solely of zero value data blocks, and that begins and ends with non-zero value data blocks (e.g., data blocks that include at least some bytes that do not represent zero or null values). Furthermore, as used herein, the term "leading zero pad" may refer to a zero pad that precedes (e.g., in the block order) a non-zero value portion in the same data page.

In some examples, a first data page and a second data page may each include the same data blocks, but may differ in the lengths (or presence) of leading zero pads. For example, the first data page may have a leading zero pad that is larger or smaller than the leading zero pad of the second data page. In another example, the first data page may have a leading zero pad of a given size, and the second data page may not have any leading zero pad. Therefore, in such examples, the first and second data pages will be composed of different ordered sequences of data blocks (e.g., when read from the data block first to the last data block). As such, the fingerprint that is generated for the first data page (e.g., by applying a hash function to the ordered sequence of data blocks in the first data page) may be different than the fingerprint that is generated for the second data page, and thus the first and second data pages may not be matched by their fingerprints. Accordingly, the first and second data pages may not be deduplicated with respect to each other, and thus may have to be stored as two different data pages in a deduplication storage system.

In accordance with some implementations of the present disclosure, a controller may receive a data page to be stored in persistent storage of a deduplication storage system. The controller may determine whether the received data page includes a leading zero pad. If so, the controller may generate a modified version of the data page (also referred to herein as a "realigned data page" or a "rotated data page") by removing the leading zero pad from the beginning (i.e., front end) of the data page, and then appending the leading zero pad to the ending (i.e., back end) of the data page. As used herein, the terms "circular shift" or "rotation" may refer to removing the leading zero pad from a beginning of a data page, and appending the leading zero pad to the ending of the data page, thereby generating a realigned data page. The controller may then generate a fingerprint for the realigned data page (e.g., by applying a hash function), and may compare the generated fingerprint to a set of fingerprints that are stored in metadata of the deduplication storage system. If the generated fingerprint does not match any of the set of fingerprints (i.e., indicating that the realigned data page is not already stored in the persistent storage of the deduplication storage system), the controller may store the realigned data page and the generated fingerprint in the persistent storage. The controller may also generate a reference that includes the generated fingerprint and a pointer to the realigned data page (stored in the persistent storage). Further, in some implementations, the reference may also include an offset value that indicates the length (e.g., in number of data blocks) of the leading zero pad.

Subsequently, upon receiving a read request for the data page, the controller may access the reference for the requested data page, and may read the pointer and offset included in the reference. The controller may use the pointer to retrieve the realigned data page from the persistent storage. Further, the controller may use the offset to return the leading zero pad to the beginning of the data page, thereby providing an identical copy of the original received data page. As used herein, the terms "reverse circular shift" or "reverse rotation" may refer to adjusting or shifting a zero pad of a realigned data page to generate a copy of an original received data page. In this manner, a single realigned data page (stored in persistent storage of the deduplication storage system) may be used to deduplicate different data pages that include various lengths of leading zero pads. Accordingly, some implementations may reduce the amount of storage space required to store data pages in the deduplication storage system. The disclosed technique for performing deduplication using realigned data pages is discussed further below with reference to FIGS. 1-8.

Figure 2A:
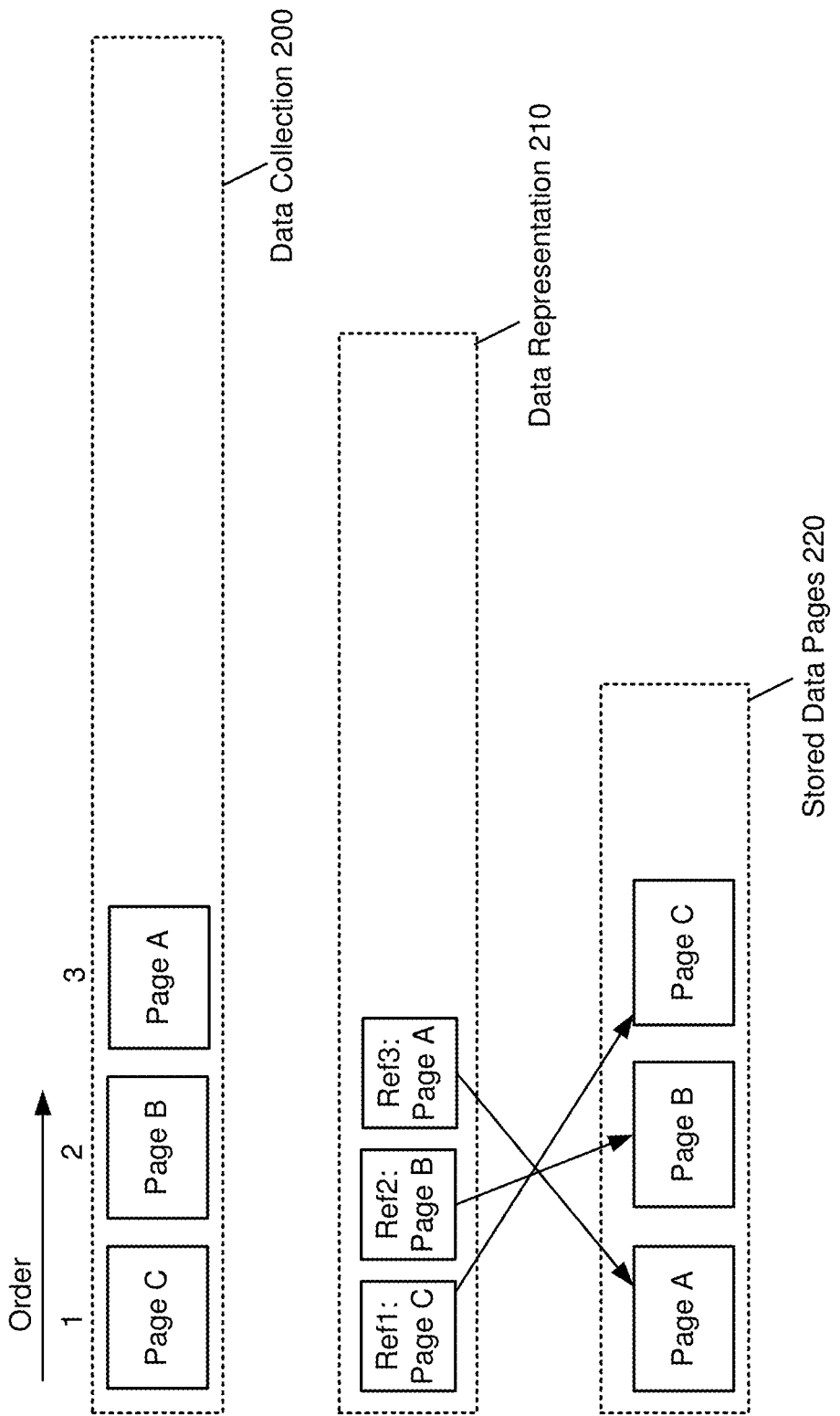
FIGS. 2A-2D are illustrations of example data elements, in accordance with some implementations.
Figure 2B:
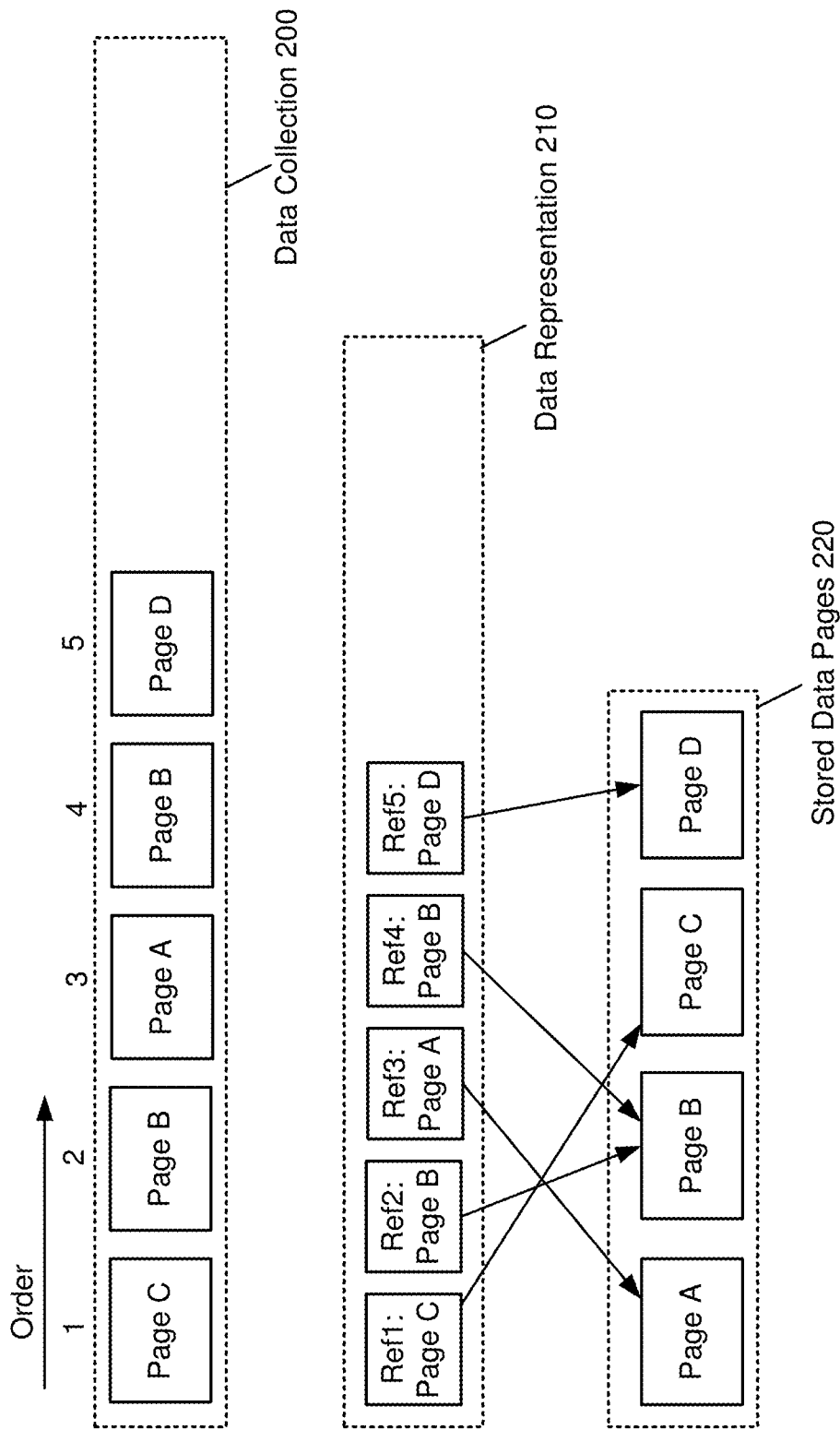
Figure 2C:
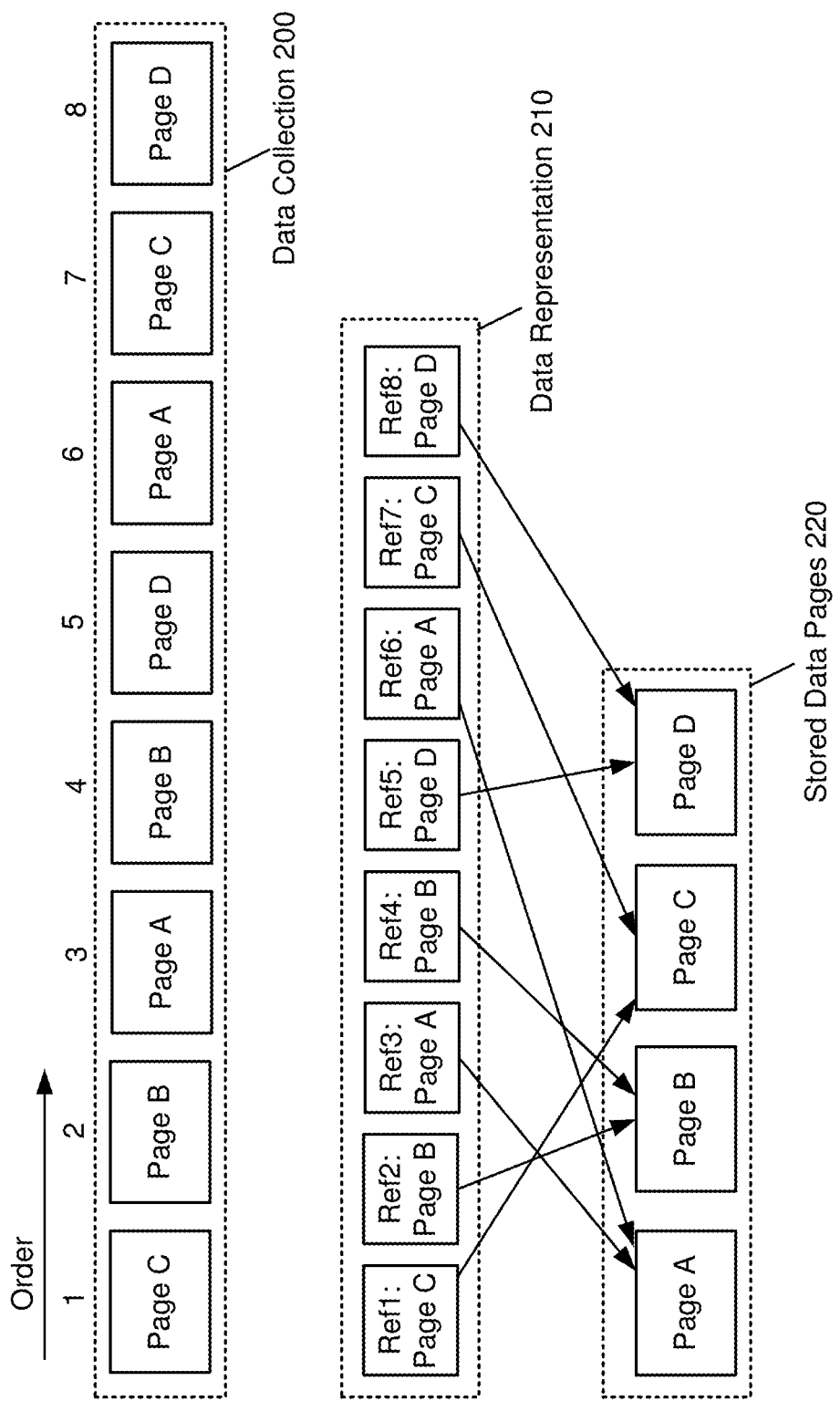
Figure 2D:
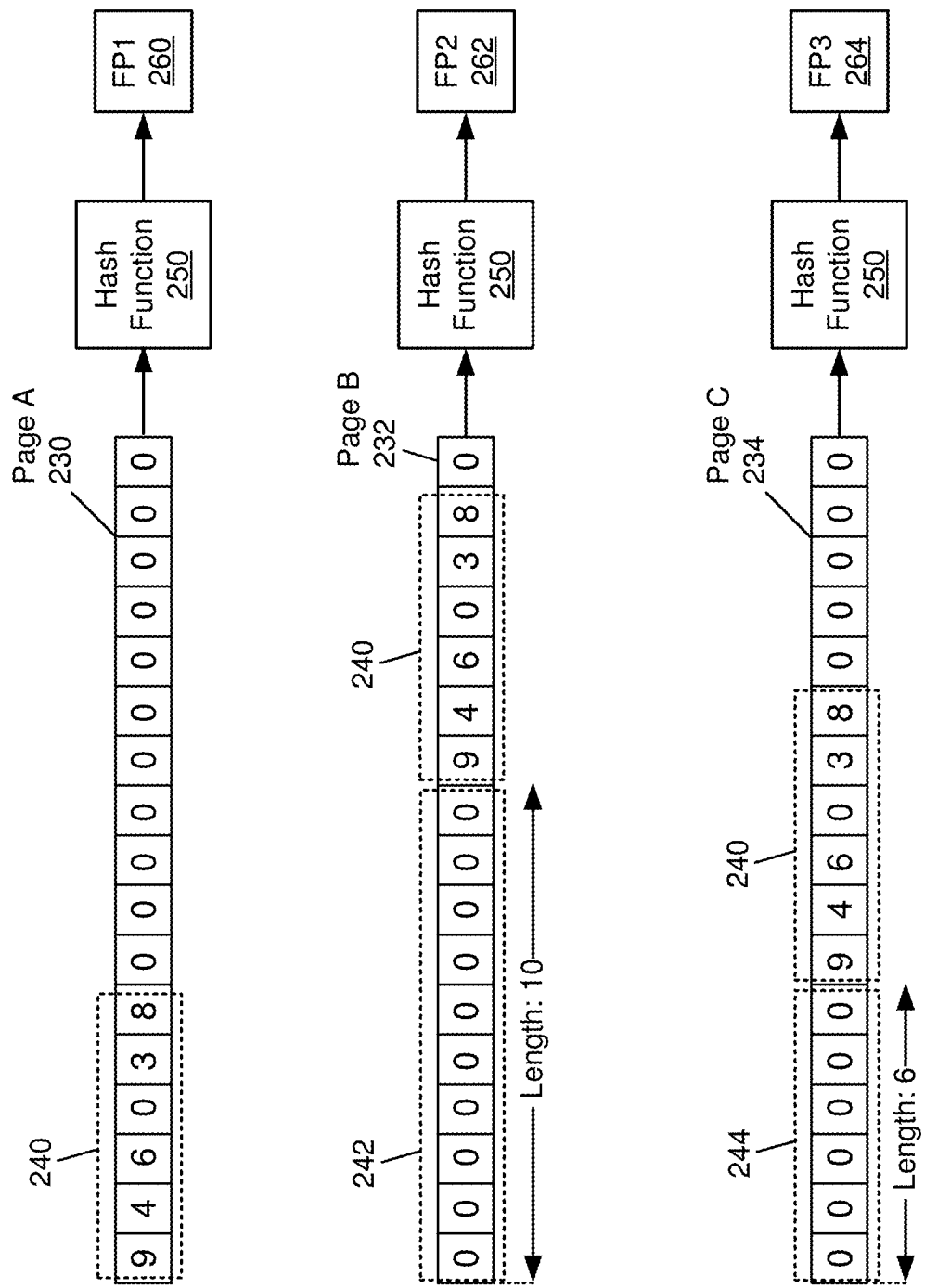

FIGS. 1-2D—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 may include a deduplication engine 120 and a realignment engine 130. As used herein, an "engine" may refer to machine-readable instructions (e.g., software instructions and/or firmware instructions stored on at least one machine-readable storage medium) executable on a hardware processing circuit. For example, the deduplication engine 120 and the realignment engine 130 may be implemented as program code that is executed by the storage controller 110 and loaded in memory 115. Further, in some implementations, the program code for engines 120, 130 may be stored in the persistent storage 130. Alternatively, an "engine" may refer to a hardware processing circuit (e.g., any or some combination of a microprocessor, a core of a multi-core microprocessor, a microcontroller, a programmable integrated circuit, a programmable gate array, a digital signal processor, or another hardware processing circuit), or a combination of a hardware processing circuit and machine-readable instructions.

In some implementations, the deduplication engine 120 may perform deduplication of stored data. For example, the deduplication engine 120 may receive or read the input data 105 including one or more data pages, and may store at least one copy of each data page as deduplicated data 122. Further, the deduplication engine 120 may use stored deduplication metadata 125 for processing and reconstructing the original input data 105 from the stored deduplicated data 122. In some implementations, each data page may include a same number (e.g., a fixed or specified number) of data blocks. Each data block may be a portion of data that can be separately identified in the storage system 100.

In some implementations, the deduplication engine 120 may generate a fingerprint for each data page. For example, the fingerprint may include a full or partial hash value based on the data page. To determine whether an input data page is a duplicate of a stored data page, the deduplication engine 120 may compare the fingerprint generated for the input data page to fingerprints stored in the deduplication metadata 125 (e.g., in a container index). The inbound data pages with fingerprints that match the stored fingerprints (in deduplication metadata 125) are determined to be copies of previous data pages that are already stored in the deduplicated data 122, and the deduplication engine 120 then stores references to the previous data pages in the deduplicated data 122 (instead of storing the duplicate input data pages). Further, the remaining inbound data pages with fingerprints that do not match the stored fingerprints are determined to be new data pages (i.e., that are not be included in the deduplicated data 122). The deduplication engine 120 then adds the new data pages to the deduplicated data 122, and updates the deduplication metadata 125 to record information about the new data pages. In some implementations, the deduplication metadata 125 may include representations (e.g., manifests or recipes) to record the order in which the data pages were received. Example implementations of data pages, fingerprints, deduplication metadata 125, and deduplicated data 122 are discussed below with reference to FIGS. 2A-2D.

Referring now to FIG. 2A, shown are example data elements in accordance with some implementations. In particular, FIG. 2A illustrates a data collection 200, a data representation 210, and stored data pages 220 at a first point in time. The data collection 200 may be a set of multiple data pages to be stored in a deduplication storage system (e.g., storage system 100 shown in FIG. 1). For example, the data collection 200 may illustrate multiple data pages that are stored in different locations or addresses in a storage volume or device. In another example, the data collection 200 may illustrate an inbound data stream including a sequence of data pages.

As shown in FIG. 2A, at the first point in time, the first three data pages ("Page C," "Page B," "Page A") have been read or received in the data collection 200. The storage controller determines that these input data pages are not yet included in the stored data pages 220 (e.g., by comparing fingerprints generated for the input data pages to stored fingerprints that uniquely identify the stored data pages 220), and in response stores copies of the input data pages C, B, A in the stored data pages 220. Further, the storage controller generates a data representation 210 that includes three references ("Ref1," "Ref2," "Ref3") to the stored data pages C, B, A. As shown in FIG. 2A, the three references in the data representation 210 are arranged to record the input data pages in the data collection 200 (e.g., in order of storage address, in order of receipt in a data stream, and so forth). In some implementations, each reference (in the data representation 210) may include a fingerprint for the referenced data page, and may also include a pointer to the stored data page (in persistent storage).

Referring now to FIG. 2B, at a second point in time, the fourth and fifth data pages ("Page B," "Page D") have been read or received in the data collection 200. Accordingly, the storage controller updates or appends the data representation 210 to include two additional references ("Ref4," "Ref5") that record the fourth and fifth input data pages. The storage controller determines that data page B is already stored in the stored data pages 220, and therefore does not store another copy of the data page B. Further, the fourth reference ("Ref4") references the previously stored copy of data page B (i.e., stored upon receipt of the second data page). Accordingly, the previously stored copy of data page B is referenced by the second and fourth references ("Ref2," "Ref4"). In this manner, the data page B is stored in deduplicated form, thereby reducing the amount of storage space required to store the two instances of data page B in the data stream 200. Furthermore, the storage controller determines that data page D is not already stored in the stored data pages 220, and therefore stores a copy of the data page D in the stored data pages 220. Further, the fifth reference ("Ref5") references the newly stored copy of data page D.

Referring now to FIG. 2C, at a third point in time, the sixth, seventh, and eighth data pages ("Page A," "Page C," "Page D") have been read or received in the data collection 200. Accordingly, the storage controller updates or appends the data representation 210 to include three additional references ("Ref6," "Ref7," "Ref8") that record these input data pages. The storage controller determines that each of the data pages A, C, D is already stored in the stored data pages 220, and therefore does not store additional copies of these data pages. Further, the three references ("Ref6," "Ref7," "Ref8") reference the previously stored copies of the data pages A, C, D.

Referring now to FIG. 2D, shown are example input data pages that include the same set of data blocks, but may differ in the lengths (or presence) of leading zero pads. In particular, the data page A 230 includes a non-zero value portion 240 (i.e., a portion that does not consist solely of zero value data blocks, and that begins and ends with non-zero value data blocks), with a remaining portion that consists solely of zero value data blocks. The data page B 232 includes a leading zero pad 242 that has a length of ten data blocks, and that precedes the non-zero value portion 240 in the data page B 232. The data page C 234 includes a leading zero pad 244 that has a length of six data blocks, and that precedes the non-zero value portion 240 in the data page B 232. It is noted that the non-zero value portion 240 can include a zero value data block (or multiple zero value data blocks) if it is not positioned as the first-ordered data block or the last-ordered data block in the non-zero value portion 240.

As illustrated in FIG. 2D, a hash function 250 may be applied to the data page A 230, thereby generating a first fingerprint ("FP1") 260 that uniquely identifies the data page A 230. Similarly, a second fingerprint 262 ("FP2") may be generated by applying the hash function 250 to the data page B 232. Further, a third fingerprint 264 ("FP3") may be generated by applying the hash function 250 to the data page C 234. It is noted that, because the input data pages 230, 232, 234 are composed of different ordered sequences of data blocks (e.g., when read from the first-ordered data block to the last-ordered data block), their respective fingerprints 260, 262, 264 are different from each other. Accordingly, the input data pages 230, 232, 234 cannot be matched by their respective fingerprints 260, 262, 264, and therefore the input data pages 230, 232, 234 may not be deduplicated with respect to each other using their respective fingerprints 260, 262, 264.

Referring again to FIG. 1, in some implementations, the realignment engine 130 may include functionality to deduplicate data pages with different leading zero pads (e.g., data pages 230, 232, 234 shown in FIG. 2D). In some implementations, the realignment engine 130 may determine whether an input data page includes a leading zero pad (e.g., leading zero pad 242 shown in FIG. 2D). In response to determining that the input data page includes a leading zero pad, the realignment engine 130 may perform a circular shift on the input data page (i.e., removing the leading zero pad from the beginning of the data page, and appending the leading zero pad to the ending of the data page), thereby generating a realigned data page (which may also be referred to herein as a data page that is "rotated," "padded and shifted," "padded for realignment," or "realigned with padding"). The realignment engine 130 may provide the realigned data page to the deduplication engine 120. As used herein, performing the circular shift of the data page (i.e., removing the leading zero pad from a beginning or front end of a data page, and appending the leading zero pad to the ending or back end of the data page) may also be referred to as "rotating the data page," "realigning the data page with padding," "shifting the data page with padding," or "padding and shifting the data page."

In some implementations, the deduplication engine 120 may generate a fingerprint for the realigned data page, and compare the generated fingerprint to fingerprints stored in the deduplication metadata 125, thereby determining whether a copy of the realigned data page is already stored in the deduplicated data 122. If it is determined that a copy of the realigned data page is not already included in the deduplicated data 122, the realigned data page may be copied into the deduplicated data 122. The deduplication engine 120 may generate or update a data representation (e.g., data representation 210 shown in FIG. 2A) to include a reference that records the input data page (e.g., in the order of the data collection 200). In some implementations, the reference may include a pointer to the stored copy of the realigned data page (in the deduplicated data 122). Further, the reference may include an offset value equal to the length (e.g., in number of data blocks) of the leading zero pad.

Subsequently, upon receiving a read request for the input data page, the deduplication engine 120 may access the reference to the input data page, and may read the pointer included in the reference. The deduplication engine 120 may use the pointer to retrieve the realigned data page from the stored deduplicated 122. The realignment engine 130 may then perform a reverse circular shift (i.e., reverse rotation) of the realigned data page. For example, the realignment engine 130 may use the offset (included in the reference) to determine the number of zero value data blocks to remove from the ending portion of the realigned data page (retrieved from the deduplicated data 122). Further, the realignment engine 130 may insert the same number of zero value data blocks at the beginning of the realigned data page, thereby restoring the leading zero pad that was present in the input data page. Accordingly, the realignment engine 130 may use the stored offset value to provide a copy of the input data page. In this manner, a single realigned data page (stored in the deduplicated data 122) may be used to deduplicate multiple input data pages that include different lengths of leading zero pads. Accordingly, some implementations may reduce the amount of storage space required to store data pages in the deduplication storage system. An example process for performing deduplication using realigned data pages is described below with reference to FIGS. 3-4D.

FIGS. 3A-4D—Example Process for Storing Deduplicated Data Pages

Figure 3A:
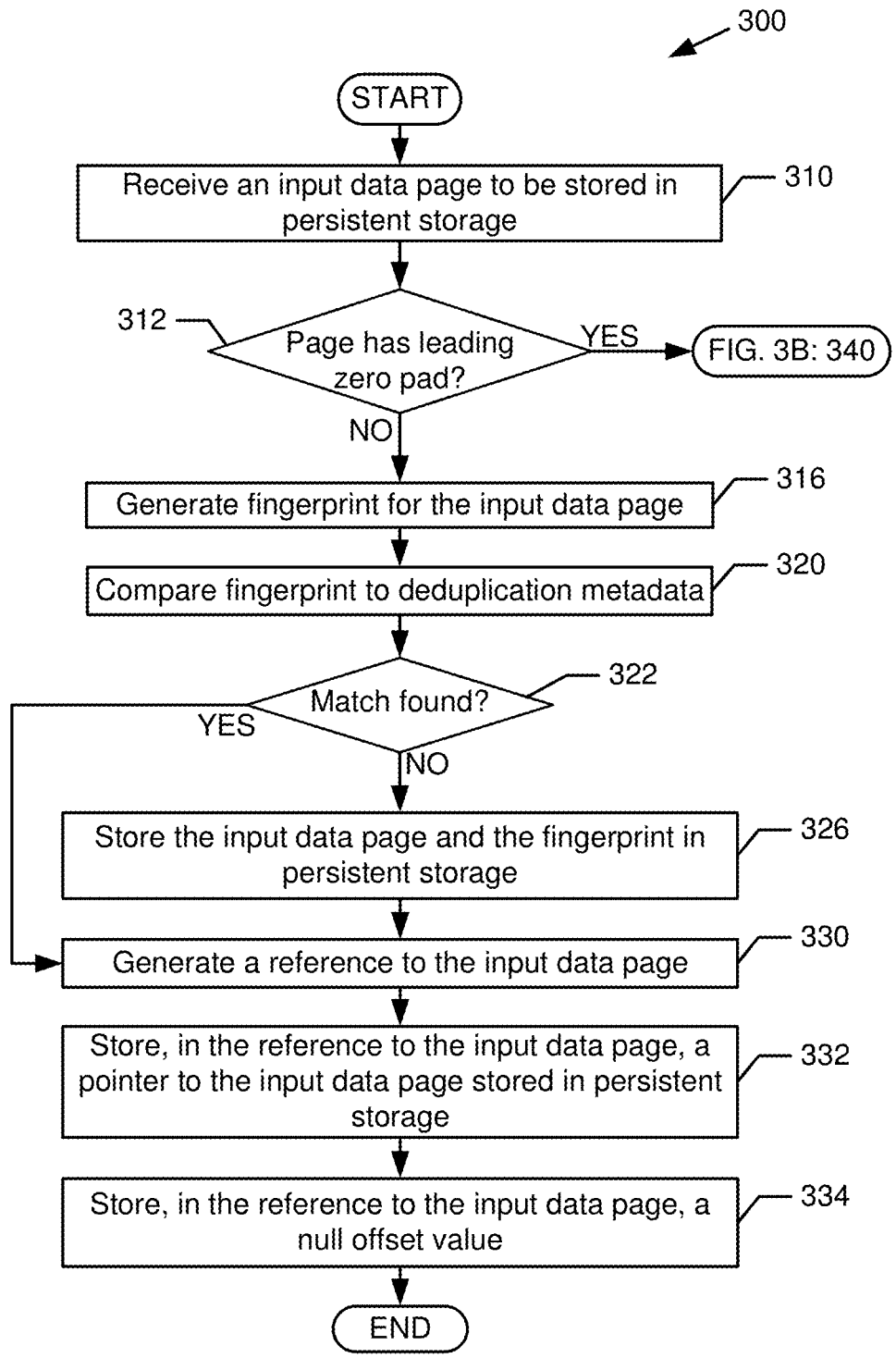
FIG. 3 is an illustration of an example process, in accordance with some implementations.
Figure 3B:
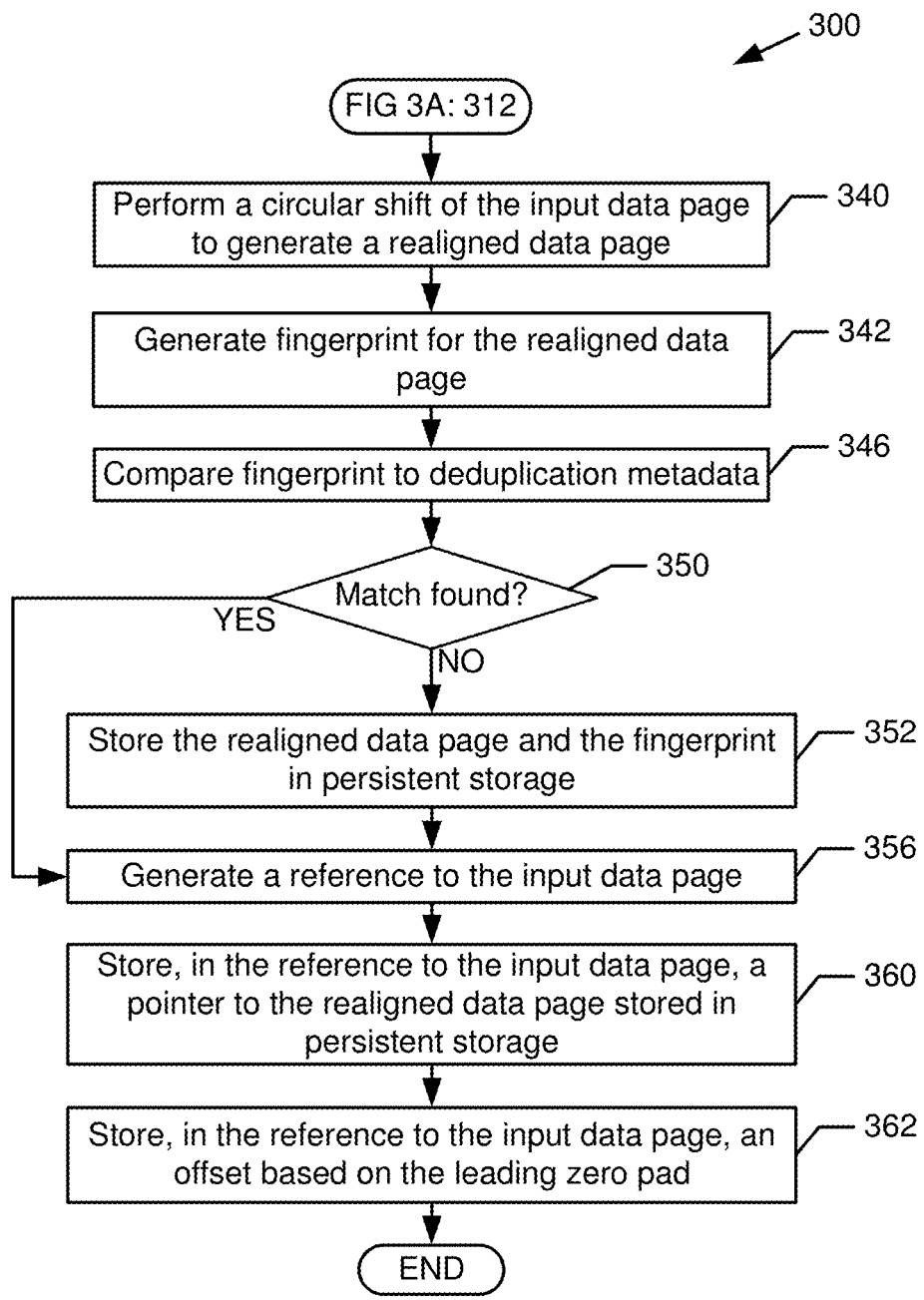

FIGS. 3A-3B show an example process 300 for storing deduplicated data pages, in accordance with some implementations. For the sake of illustration, details of the process 300 may be described below with reference to FIGS. 4A-4D, which show examples in accordance with some implementations. However, other implementations are also possible. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Referring to FIG. 3A, block 310 may include receiving an input data page to be stored in persistent storage of a deduplication storage system. Decision block 312 may include determining whether the input data page includes a leading zero pad. For example, referring to FIG. 1, the storage system 110 reads or receives input data 105 that includes one or more data pages. Each input data page may include a specified or fixed number of data blocks (e.g., thirty-two data blocks). The storage controller 110 reads the data blocks in an input data page, and determines whether the input data page includes a zero pad (i.e., a portion that consists solely of zero value data blocks) that precedes a non-zero value portion (i.e., a portion that does not consist solely of zero value data blocks, and that begins and ends with non-zero value data blocks).

Referring again to FIG. 3A, if it is determined at block 312 that the input data page includes a leading zero pad ("YES"), the process 300 may continue at block 340 (described below with reference to FIG. 3B). Otherwise, if it is determined at block 312 that the input data page does not include a leading zero pad ("NO"), the process 300 may continue at block 316, including generating a fingerprint for the input data page. Block 320 may include comparing the generated fingerprint to deduplication metadata. Decision block 322 may include determining whether a match is found between the generated fingerprint and the deduplication metadata. For example, referring to referring to FIG. 4A, a controller (e.g., storage controller 110 shown in FIG. 1) determines that the input data page A 230 does not include a leading zero pad, and in response applies the hash function 250 to the input data page A 230 to generate the fingerprint "FP1" 260. Further, the controller determines whether the fingerprint "FP1" 260 matches any of the fingerprints stored in the deduplication metadata 125.

In some implementations, determining whether that the input data page includes a leading zero pad (at decision block 312) may be based on a threshold length that indicates the minimum length for leading zero pads. For example, in an implementation using a threshold length for the leading zero pad is five data blocks, a first data page beginning with a string of four (or less) zero value data blocks would not be considered to have a leading zero pad, and therefore would result in a negative determination ("NO") at decision block 312. However, in the same implementation, a second data page beginning with a string of five (or more) zero value data blocks would be considered to have a leading zero pad, and therefore would result in a positive determination ("YES") at decision block 312. Further, in implementations using a threshold length for the leading zero pad, a controller may initially determine whether the first data block in the data page is a zero value data block, and if not may result in a negative determination ("NO") at decision block 312 (i.e., without evaluating any additional data blocks). In this manner, the result of decision block 312 may be determined without having to calculate the total length of a string of zero value blocks at the beginning of the data page, and then comparing the total length to the threshold length.

Referring again to FIG. 3A, if it is determined at decision block 322 that no matches are found between the generated fingerprint and the deduplication metadata the input data page ("NO"), the process 300 may continue at block 326, including storing the input data page and the fingerprint in persistent storage. For example, referring to FIG. 4A, the controller determines that the fingerprint "FP1" 260 (generated from the input data page A 230) does not match any of the fingerprints stored in the deduplication metadata 125. In response to this determination, the controller stores the input data page A 230 and the associated fingerprint "FP1" 260 in the deduplication data 410 (e.g., in an entry or record included in the deduplicated data 122 stored in persistent storage 140).

Referring again to FIG. 3A, after block 326, or if it is determined at decision block 322 that a match is found between the generated fingerprint and the deduplication metadata the input data page ("YES"), the process 300 may continue at block 330, including generating a reference to the input data page. Block 332 may include storing, in the reference to the input data page, a pointer to the input data page stored in persistent storage. Block 334 may include storing, in the reference to the input data page, a null offset value. After block 334, the process 300 may be completed. For example, referring to FIG. 4A, the controller generates a page reference 420 for the input data page A 230. The page reference 420 includes a page pointer to the input data page A 230. In some implementations, the page pointer identifies the fingerprint "FP1" 260 (e.g., "Page ID: FP1") associated with the input data page A 230. Further, in some implementations, the page reference 420 includes an offset value that indicates the length (or absence) of any leading zero pad that is present in the input data page A 230. It is noted that, in the example shown in FIG. 4A, the input data page A 230 does not include a leading zero pad. Accordingly, in some implementations, the page reference 420 may optionally include a null or zero offset value (e.g., "Offset: 0"). Alternatively, in other implementations, the page reference 420 may not include any offset value when the input data page A 230 does not include a leading zero pad. Furthermore, in some implementations, the page reference 420 includes a reference identifier or number (e.g., "Ref. Number: 1") that indicates the location or order of the input data page A 230 in a data collection (e.g., data collection 200 shown in FIG. 2A).

Referring now to FIG. 3B, block 340 may include performing a circular shift of the input data page to generate a realigned data page. Block 342 may include generating a fingerprint for the realigned data page. Block 346 may include comparing the generated fingerprint to deduplication metadata. Decision block 350 may include determining whether a match is found between the generated fingerprint and the deduplication metadata.

Figure 4A:
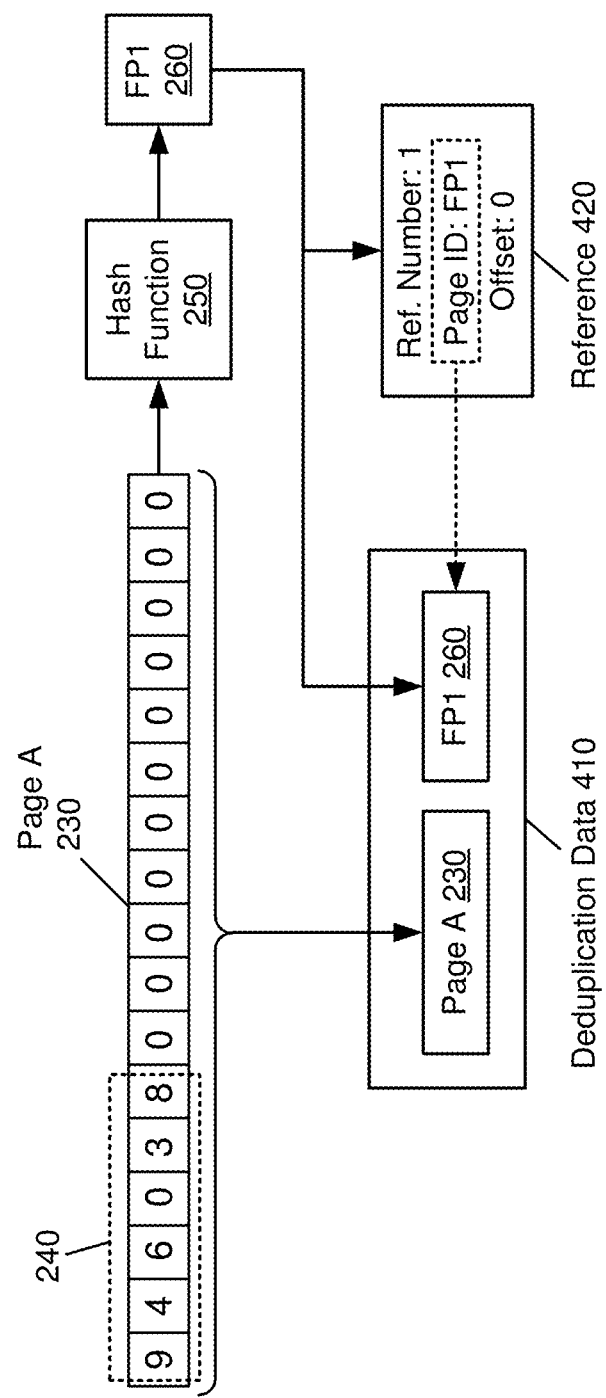
FIGS. 4A-4D are illustrations of example operations, in accordance with some implementations.
Figure 4B:
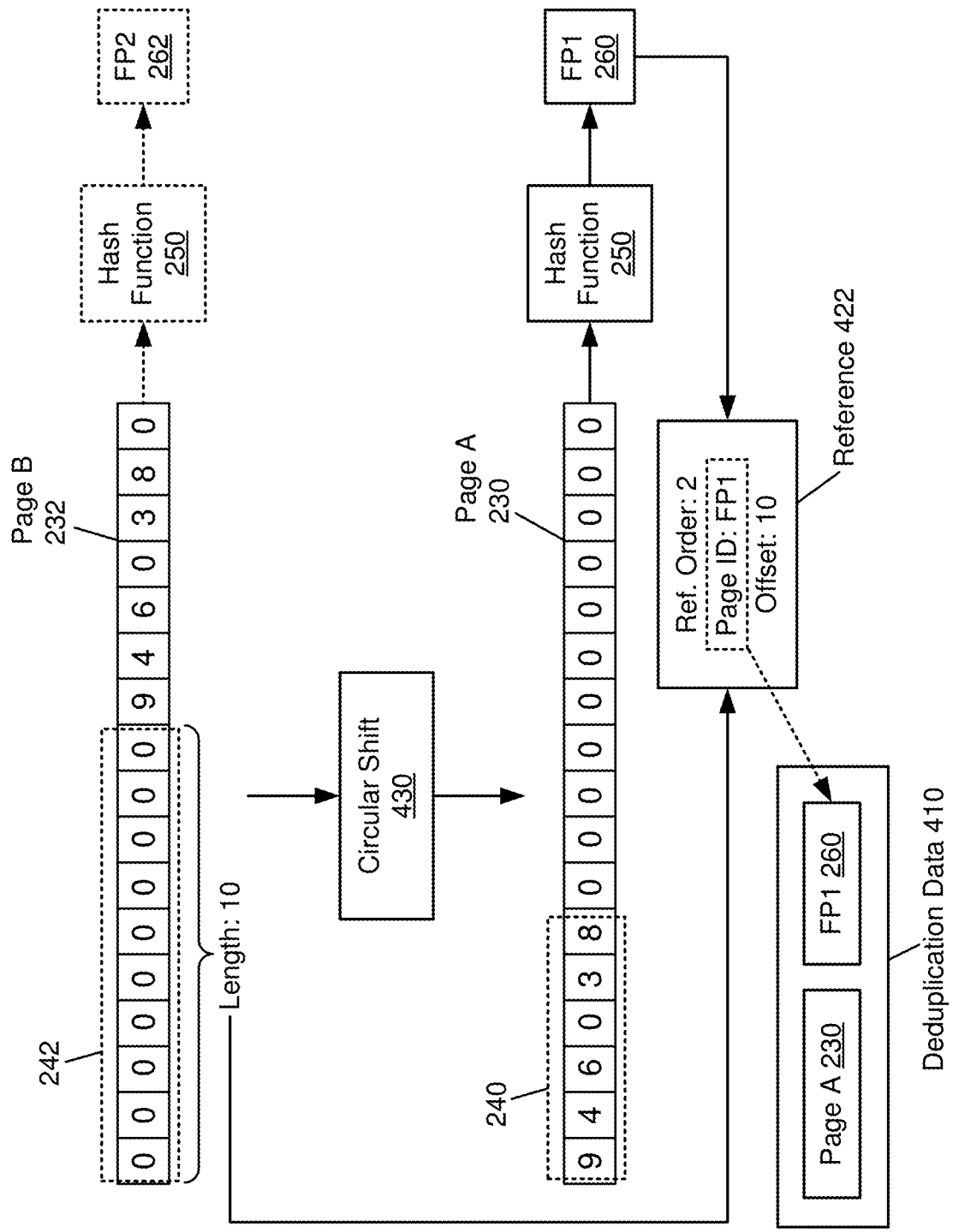

For example, referring to FIG. 4B, the controller determines that the input data page B 232 includes a leading zero pad 242, and in response performs a circular shift 430 of the input data page B 232 (i.e., rotating the input data page B 232). In particular, performing the circular shift 430 includes moving the leading zero pad 242 from the beginning of the input data page B 232 to the ending of the input data page B 232, thereby generating a realigned data page that is identical to the data page A 230. The hash function 250 is applied to the realigned data page, thereby generating the fingerprint "FP1" 260. Further, the controller compares the generated fingerprint "FP1" 260 to fingerprints stored in the deduplication metadata 125 (e.g., in page reference 420).

Figure 4C:
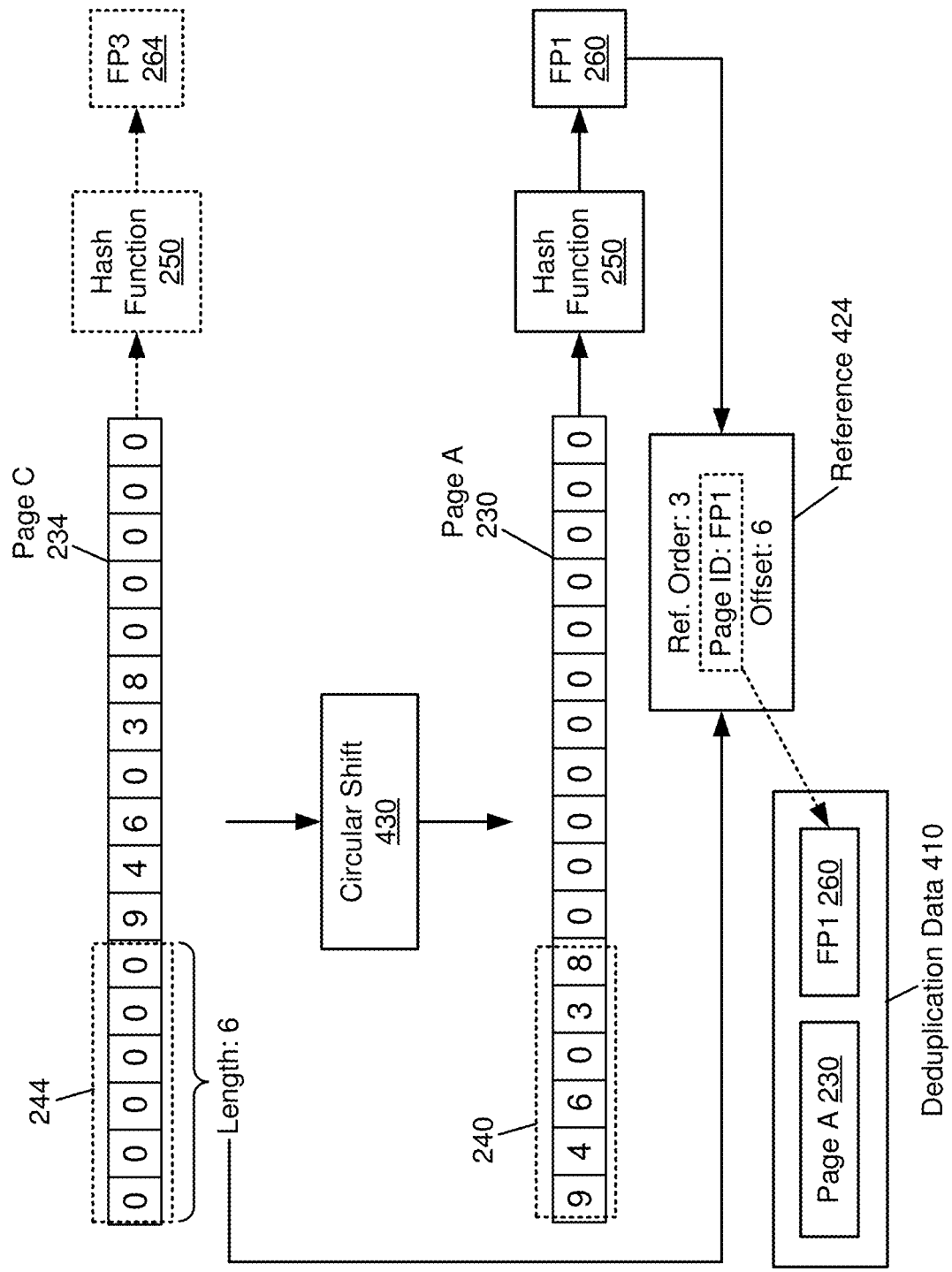
Figure 4D:
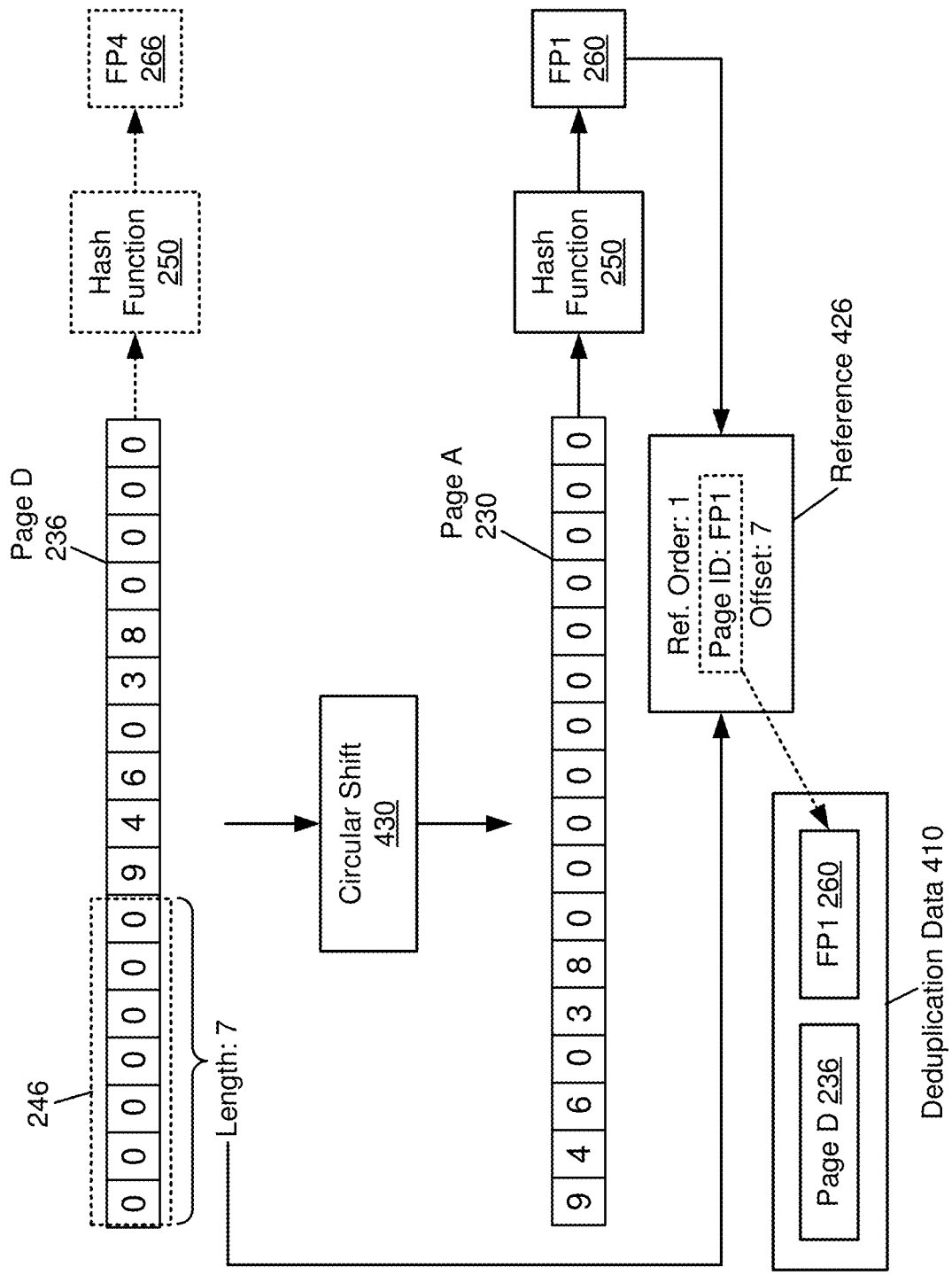

In another example, referring to FIG. 4C, the controller determines that the input data page C 234 includes a leading zero pad 244. In response to this determination, the controller performs a circular shift 430 of the input data page C 234 (i.e., realigning the input data page C 234 with padding), thereby generating a realigned data page that is identical to the data page A 230. The hash function 250 is applied to the realigned data page, thereby generating the fingerprint "FP1" 260. Further, the controller compares the generated fingerprint "FP1" 260 to fingerprints stored in the deduplication metadata 125.

Referring again to FIG. 3B, if it is determined at decision block 350 that no matches are found between the generated fingerprint and the deduplication metadata ("NO"), the process 300 may continue at block 352, including storing the realigned data page and the fingerprint in persistent storage. After block 352, or if it is determined at block 350 that a match is found between the generated fingerprint and the deduplication metadata the input data page ("YES"), the process 300 may continue at block 356, including generating a reference to the input data page. Block 360 may include storing, in the reference to the input data page, a pointer to the realigned data page stored in persistent storage. Block 362 may include storing, in the reference to the input data page, an offset based on the leading zero pad. After block 362, the process 300 may be completed.

For example, referring to FIG. 4B, the controller generates a page reference 422 that represents the input data page B 232. The controller determines whether the fingerprint "FP1" 260 (generated for the realigned data page) matches the fingerprints stored in existing page references (e.g., page reference 420). If a fingerprint match is found (indicating that an existing copy of the data page A 230 is already stored in the deduplicated data 410), the page reference 422 includes a page pointer to the existing copy of the data page A 230. Otherwise, if no fingerprint matches are found (indicating that the data page A 230 is not already stored in the deduplicated data 410), a copy of the realigned data page (i.e., data page A 230) is newly stored in the deduplicated data 410, and the page reference 422 includes a page pointer to the newly-stored copy of the realigned data page. The page reference 422 also includes an offset value ("Offset: 10") that is equal to the length of the leading zero pad 242 in the input data page B 232.

In another example, referring to FIG. 4C, the controller generates a page reference 424 that represents the input data page C 234. The controller determines whether the fingerprint "FP1" 260 matches the fingerprints stored in existing page references (e.g., page reference 420). If a fingerprint match is found, the page reference 424 includes a page pointer to the existing copy of the data page A 230. Otherwise, if not fingerprint matches are found, a copy of the realigned data page is newly stored in the deduplicated data 410, and the page reference 424 includes a page pointer to the newly-stored copy of the realigned data page. The page reference 424 also includes an offset value ("Offset: 6") that is equal to the length of the leading zero pad 244 in the input data page C 234.

Note that, while FIGS. 3B-4C illustrate an example in which the deduplication data 420 stores a realigned data page (i.e., data page A 230), other implementations are possible. For example, referring now to FIG. 4D, assume that the data page D 236 is received before data page A 230 (or data pages 232, 234). As shown, a circular shift 430 of the input data page D 236 may be performed to generate a realigned data page (equivalent to data page A 230), and the hash function 250 is applied to generate the fingerprint "FP1" 260. Further, because the data pages 230, 232, 234 have not yet been received, the generated fingerprint "FP1" 260 does not match any previous data pages that are stored in the deduplication data 420. Accordingly, in some implementations, a copy of the received data page D 236 may be stored in the deduplication data 420 in its original form (i.e., as received), along with the fingerprint "FP1" 260 (generated from the realigned version of the data page). Further, as shown in FIG. 4D, the page reference 426 (representing the data page D 236) may include a page pointer to the stored received data page D 236 (using the fingerprint "FP1" 260) and the offset value ("Offset: 7") that is equal to the length of the leading zero pad 246 in the input data page D 236.

Figure 5:
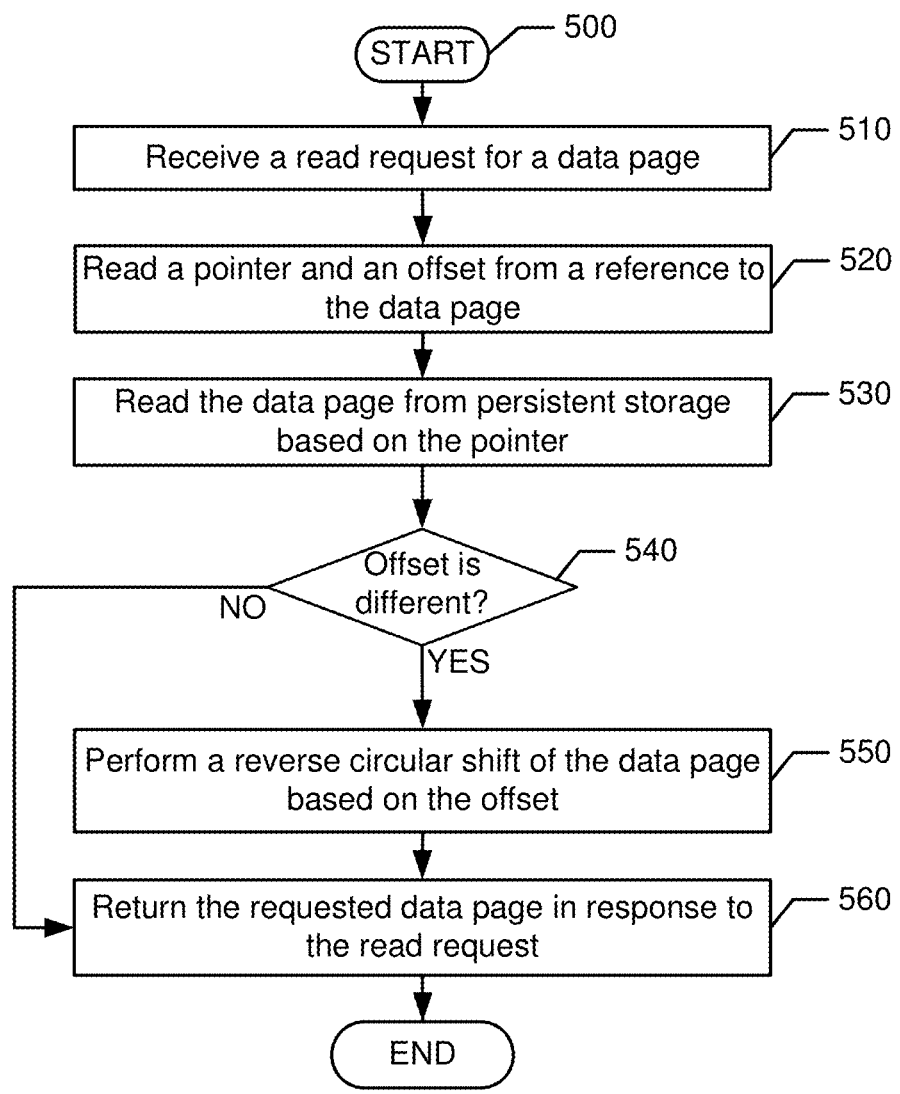
FIG. 5 is an illustration of an example process, in accordance with some implementations.

FIG. 5—Example Process for Reading Deduplicated Data Pages

FIG. 5 shows an example process 500 for reading deduplicated data pages, in accordance with some implementations. For the sake of illustration, details of the process 500 may be described below with reference to FIGS. 1-4D, which show examples in accordance with some implementations. However, other implementations are also possible. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 510 may include receiving a read request for a data page stored in persistent storage of a deduplication storage system. Block 520 may include reading a pointer and an offset from a reference to the data page. Block 530 may include reading the data page from persistent storage based on the pointer. Decision block 540 may determining whether the offset of the requested data page (stored in the reference to the requested data page) is different from the offset of the stored data page (stored in the reference to the stored data page). If so ("YES"), the process 500 may continue at block 550, including performing a reverse circular shift of the data page based on the offset. After block 550, or if it is determined at decision block 540 that the offset of the requested data page is not different from the offset of the stored data page ("NO"), the process 500 may continue at block 560, including returning the requested data page in response to the read request. After block 560, the process 500 may be completed.

For example, referring to FIGS. 4A-4B, a controller (e.g., storage controller 110 shown in FIG. 1) receives a read request for the data page B 232. The controller accesses the page reference 422 that represents the requested data page B 232. The controller reads the page pointer (e.g., "Page ID: FP1") included in the page reference 422, and uses the page pointer to read or retrieve the stored data page A 230 from the deduplicated data 410 (e.g., by loading from the persistent storage 140 into the memory 115 shown in FIG. 1). The controller determines that the offset for the requested data page B 232 (included in page reference 422) has a value of "10," and is thus different from the offset ("0") for the stored data page A 230 (included in page reference 420). In response to this determination, the controller performs a reverse circular shift of the retrieved data page A 230 so that the resulting data page has the offset specified in the page reference 422 (representing the requested data page B 232). For example, the reverse circular shift may include removing, from the back end of the retrieved data page A 230, a string of zero value data blocks that has a length equal to the offset (i.e., ten zero value data blocks), and appending the removed string to the front end of the retrieved data page A 230. In this manner, performing the reverse circular shift results in a copy of the requested data page B 232 (i.e., in the original form as initially received by the storage system 100). The controller then returns the requested data page B 232 in a response to the read request.

In another example, referring to FIG. 4A, the controller receives a read request for the data page A 230. The controller accesses the page reference 420 that represents the requested data page A 230. The controller reads the page pointer (e.g., "Page ID: FP1") included in the page reference 420, and uses the page pointer to read or retrieve the stored data page A 230 from the deduplicated data 410. The controller determines that the offset (included in the page reference 420) has a value of zero (or a null value). In response to this determination, the controller then returns the requested data page A 230 in a response to the read request.

In some implementations, the read process 500 may be performed to read deduplicated data pages that were stored using the storage process 300 (discussed above with reference to FIGS. 3A-3B). For example, the read process 500 may be used to read stored data pages that did not have leading zero pads (i.e., following the "NO" determination at decision block 312), stored data pages that have leading zero pads (i.e., following the "YES" determination at decision block 312), or any combination thereof. Further, the read process 500 may also be used to read other data pages (also referred to as "legacy data pages") that were stored without undergoing the storage process 300, instead of (or along with) data pages that were stored using the storage process 300. For example, a page reference for a legacy data page may have a null or zero value instead of (e.g., in the same location as) the offset value, and therefore may be evaluated at decision block 540 ("offset is different?") during the read process 500. In this manner, the read process 500 may be compatible with a combination of legacy data pages and data pages stored using the storage process 300.

Figure 6:
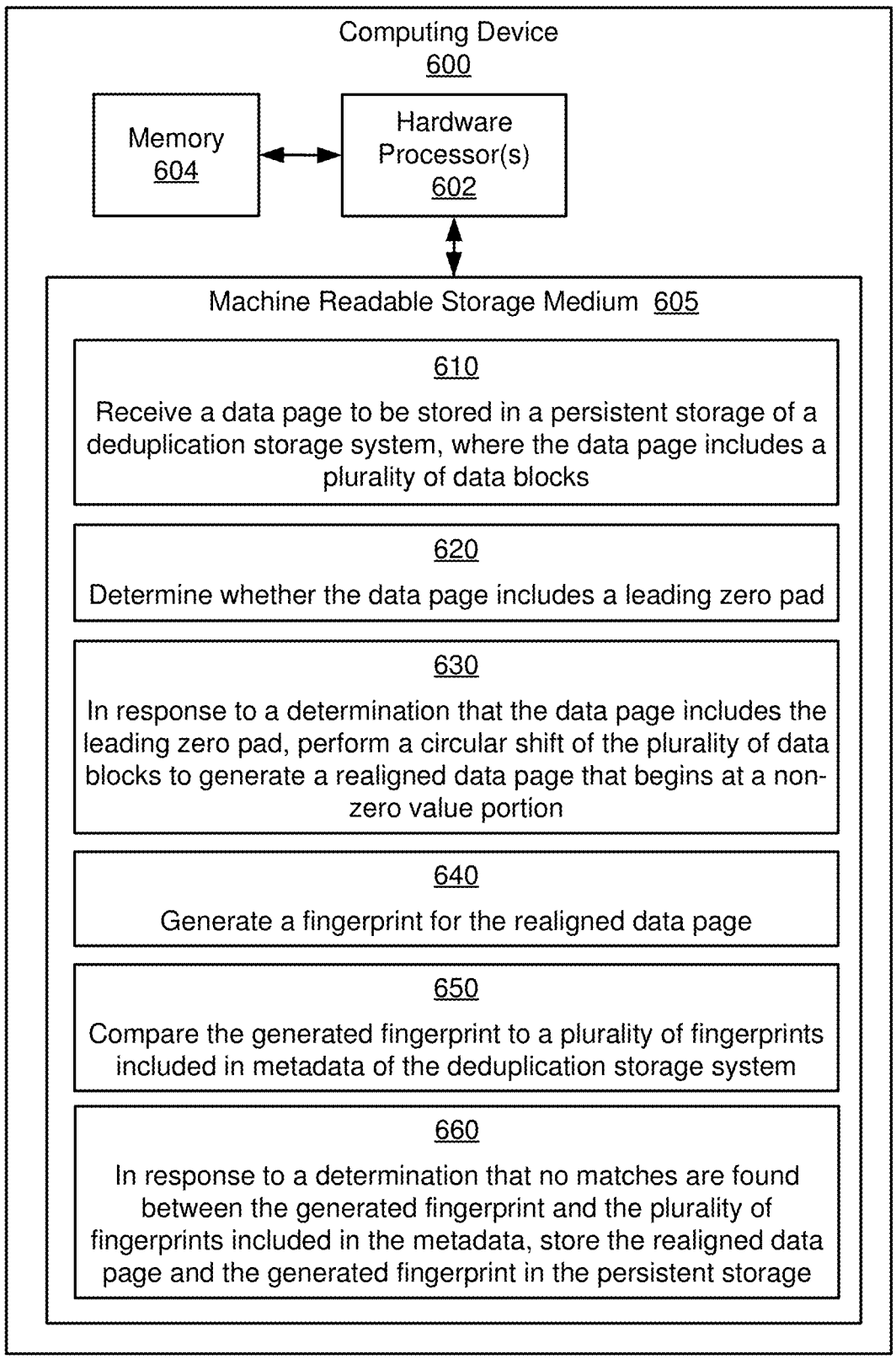
FIG. 6 is a schematic diagram of an example computing device, in accordance with some implementations.

FIG. 6—Example Computing Device

FIG. 6 shows a schematic diagram of an example computing device 600. In some examples, the computing device 600 may correspond generally to some or all of the storage system 100 (shown in FIG. 1). As shown, the computing device 600 may include a hardware processor 602, a memory 604, and machine-readable storage 605 including instructions 610-650. The machine-readable storage 605 may be a non-transitory medium. The instructions 610-650 may be executed by the hardware processor 602, or by a processing engine included in hardware processor 602.

Instruction 610 may be executed to receive a data page to be stored in a persistent storage of a deduplication storage system, where the data page includes a plurality of data blocks. Instruction 620 may be executed to determine whether the data page includes a leading zero pad. For example, referring to FIG. 1, the storage system 100 reads or receives input data 105 that includes one or more data pages. The storage controller 110 reads the data blocks in an input data page, and determines whether the input data page includes a zero pad (i.e., a portion that consists solely of zero value data blocks) that precedes a non-zero value portion.

Instruction 630 may be executed to, in response to a determination that the data page includes the leading zero pad, perform a circular shift of the plurality of data blocks to generate a realigned data page that begins at a non-zero value portion. For example, referring to FIG. 4B, a controller (e.g., storage controller 110 shown in FIG. 1) determines that the input data page B 232 includes a leading zero pad 242, and in response performs a circular shift 430 of the input data page B 232. In particular, performing the circular shift 430 includes moving the leading zero pad 242 from the beginning of the input data page B 232 to the ending of the input data page B 232, thereby generating a realigned data page that is identical to the data page A 230.

Instruction 640 may be executed to generate a fingerprint for the realigned data page. Instruction 650 may be executed to compare the generated fingerprint to a plurality of fingerprints included in metadata of the deduplication storage system. Instruction 660 may be executed to, in response to a determination that no matches are found between the generated fingerprint and the plurality of fingerprints included in the metadata, store the realigned data page and the generated fingerprint in the persistent storage. For example, referring to FIG. 4B, the controller applies the hash function 250 to the realigned data page, thereby generating the fingerprint "FP1" 260. Further, the controller compares the generated fingerprint "FP1" 260 to fingerprints stored in the deduplication metadata 125 (e.g., in page reference 420). The controller determines that no fingerprint matches are found (indicating that the data page A 230 is not already stored in the deduplicated data 410). In response to this determination, the controller stores a copy of the realigned data page (i.e., data page A 230) in the deduplicated data 410. In some implementations, the copy of the realigned data page may be stored (in deduplicated data 410) along with a copy of the fingerprint "FP1" 260.

Figure 7:
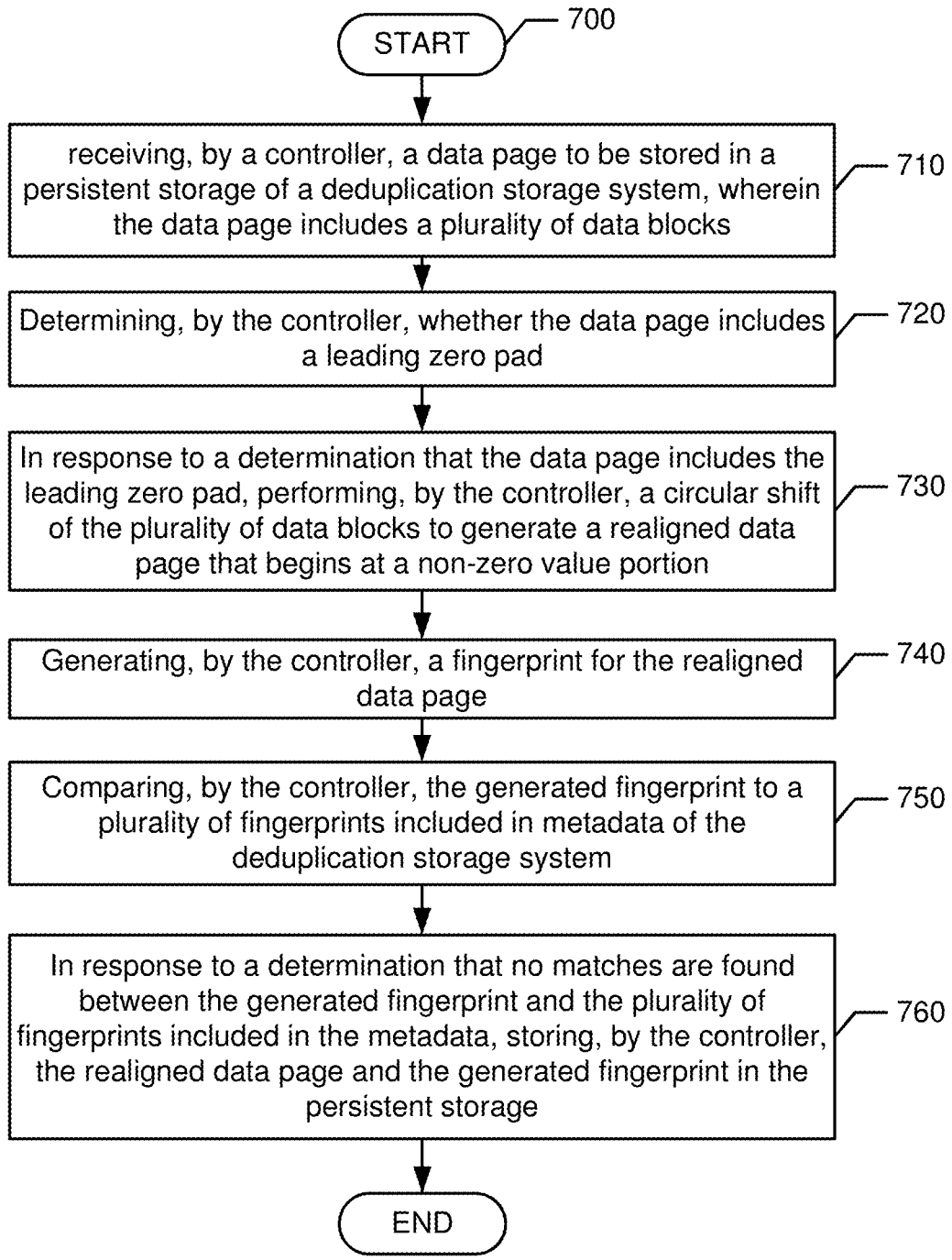
FIG. 7 is an illustration of an example process, in accordance with some implementations.

FIG. 7—Example Process for Storing Deduplicated Data Pages

FIG. 7 shows an example process 700 for storing deduplicated data pages, in accordance with some implementations. In some examples, the process 700 may be performed using the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 710 may include receiving, by a controller, a data page to be stored in a persistent storage of a deduplication storage system, where the data page includes a plurality of data blocks. Block 720 may include determining, by the controller, whether the data page includes a leading zero pad. Block 730 may include, in response to a determination that the data page includes the leading zero pad, performing, by the controller, a circular shift of the plurality of data blocks to generate a realigned data page that begins at a non-zero value portion. Block 740 may include generating, by the controller, a fingerprint for the realigned data page.

Block 750 may include comparing, by the controller, the generated fingerprint to a plurality of fingerprints included in metadata of the deduplication storage system. Block 760 may include, in response to a determination that no matches are found between the generated fingerprint and the plurality of fingerprints included in the metadata, storing, by the controller, the realigned data page and the generated fingerprint in the persistent storage. Blocks 710-760 may correspond generally to the examples described above with reference to instructions 610-660 (shown in FIG. 6).

Figure 8:
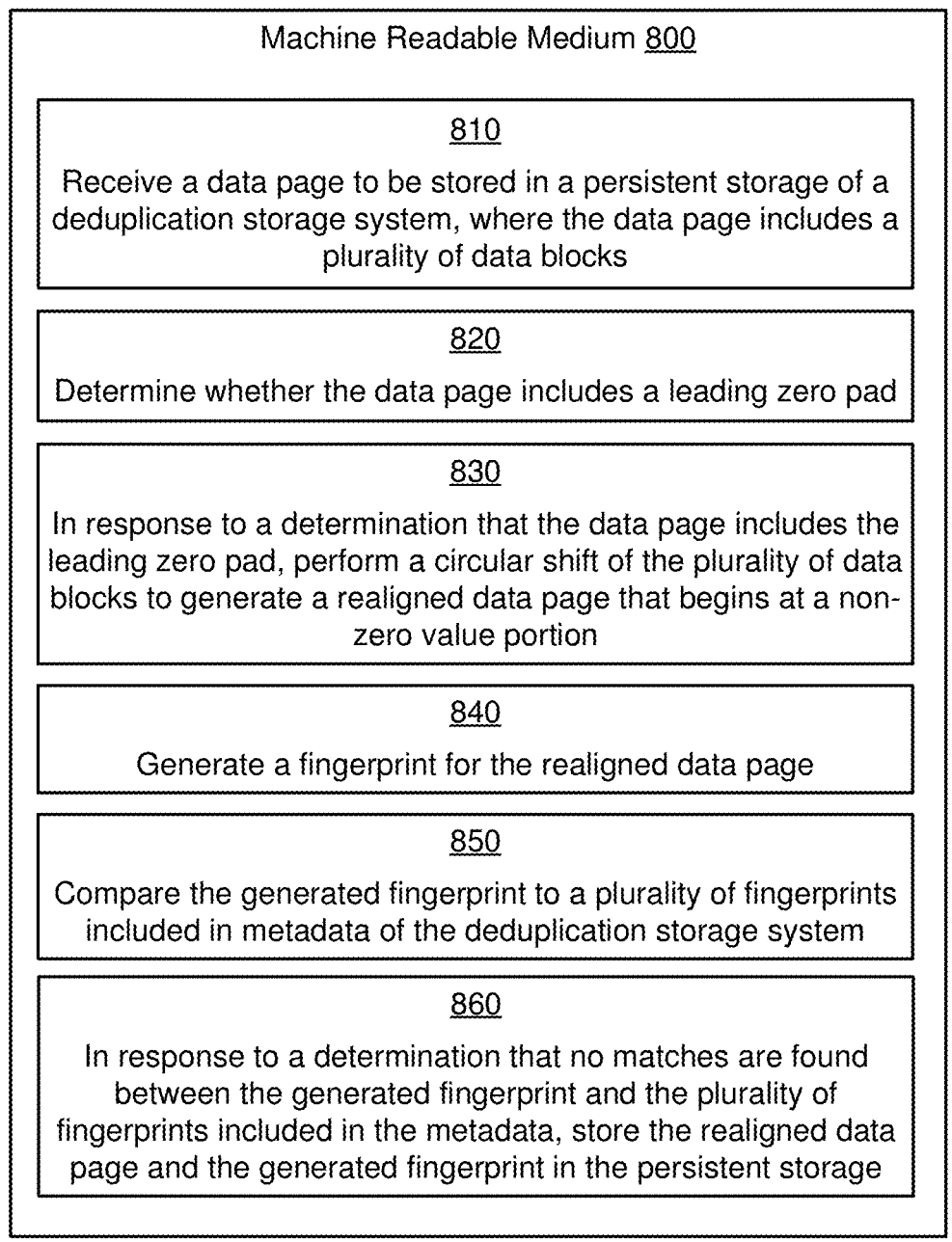
FIG. 8 is a diagram of an example machine-readable medium storing instructions in accordance with some implementations.

FIG. 8—Example Machine-Readable Medium

FIG. 8 shows a machine-readable medium 800 storing instructions 810-860, in accordance with some implementations. The instructions 810-860 can be executed by a single processor, multiple processors, a single processing engine, multiple processing engines, and so forth. The machine-readable medium 800 may be a non-transitory storage medium, such as an optical, semiconductor, or magnetic storage medium. The instructions 810-860 may correspond generally to the examples described above with reference to instructions 610-660 (shown in FIG. 6).

Instruction 810 may be executed to receive a data page to be stored in a persistent storage of a deduplication storage system, where the data page includes a plurality of data blocks. Instruction 820 may be executed to determine whether the data page includes a leading zero pad. Instruction 830 may be executed to, in response to a determination that the data page includes the leading zero pad, perform a circular shift of the plurality of data blocks to generate a realigned data page that begins at a non-zero value portion.

Instruction 840 may be executed to generate a fingerprint for the realigned data page. Instruction 850 may be executed to compare the generated fingerprint to a plurality of fingerprints included in metadata of the deduplication storage system. Instruction 860 may be executed to, in response to a determination that no matches are found between the generated fingerprint and the plurality of fingerprints included in the metadata, store the realigned data page and the generated fingerprint in the persistent storage.

CONCLUSION

In accordance with implementations described herein, a controller may receive a data page to be stored in persistent storage of a deduplication storage system. The controller may determine whether the received data page includes a leading zero pad. If so, the controller may perform a circular shift of the received data page to generate a realigned data page. The controller may generate a fingerprint for the realigned data page, and may compare the generated fingerprint to a set of fingerprints that are stored in metadata of the deduplication storage system. If the generated fingerprint does not match any of the set of fingerprints, the controller may store the realigned data page and the generated fingerprint in the persistent storage. The controller may also generate a reference that includes the generated fingerprint and a pointer to the realigned data page. Further, in some implementations, the reference may also include an offset value that indicates the length of the leading zero pad. Subsequently, upon receiving a read request for the data page, the controller may access the reference for the requested data page, and may read the pointer and offset included in the reference. The controller may use the pointer to retrieve the realigned data page from the persistent storage. Further, the controller may use the offset to perform a reverse circular shift of the realigned data page, thereby resulting in a copy of the requested data page. In this manner, the stored realigned data page may be used to deduplicate different data pages that include various lengths of leading zero pads. Accordingly, some implementations may reduce the amount of storage space required to store data pages in the deduplication storage system, and may thereby improve the performance of the deduplication storage system.

Note that, while FIGS. 1-8 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
   a processor;
   a memory; and
   a machine-readable storage storing instructions, the instructions executable by the processor to:
      receive a data page to be stored in a persistent storage of a deduplication storage system, wherein the data page includes a plurality of data blocks;
      determine whether the data page includes a leading zero pad;
      in response to a determination that the data page includes the leading zero pad, perform a circular shift of the plurality of data blocks to generate a realigned data page that begins at a non-zero value portion;
      generate a fingerprint for the realigned data page;
      compare the generated fingerprint to a plurality of fingerprints included in metadata of the deduplication storage system; and
      in response to a determination that no matches are found between the generated fingerprint and the plurality of fingerprints included in the metadata, store the realigned data page and the generated fingerprint in the persistent storage.

2. The computing device of claim 1, including instructions executable by the processor to:
   generate a reference to the data page; and
   store the reference in the metadata of the deduplication storage system.

3. The computing device of claim 2, including instructions executable by the processor to:
   store, in the reference to the data page, a pointer to the realigned data page stored in the persistent storage; and
   store, in the reference to the data page, an offset based on a length of the leading zero pad.

4. The computing device of claim 3, including instructions executable by the processor to:
   receive a read request for the data page;
   read the pointer and the offset stored in the reference to the data page;
   read, using the pointer, the realigned data page from the persistent storage;
   perform, using the offset, a reverse circular shift of the realigned data page to generate a copy of the data page; and
   return the copy of the data page in response to the read request.

5. The computing device of claim 2, including instructions executable by the processor to:
   in response to a determination that a match is found between the generated fingerprint and a stored fingerprint included in the persistent storage:
      store, in the reference to the data page, a pointer to an existing copy of the data page stored in the persistent storage; and
      store, in the reference to the data page, a null offset value.

6. The computing device of claim 1, including instructions executable by the processor to:
   receive a second data page to be stored in the persistent storage;
   in response to a determination that the second data page does not include a leading zero pad:
   generate a second fingerprint for the second data page;
   compare the second fingerprint to the plurality of fingerprints stored in the persistent storage;
   in response to a determination that no matches are found between the second fingerprint and the plurality of fingerprints, store the second data page and the second fingerprint in the persistent storage;
   generate a second reference to the second data page stored in the persistent storage;
   store, in the second reference, a pointer to the second data page stored in the persistent storage; and
   store, in the second reference, a null offset value.

7. The computing device of claim 1, wherein the data page is included in a plurality of data pages, and wherein each of the plurality of data pages includes a same number of data blocks.

8. The computing device of claim 1, wherein each data block in the leading zero pad is a zero value data block, and wherein a total number of data blocks in the leading zero pad portion exceeds a threshold that indicates a minimum length for leading zero pads.

9. A method comprising:
receiving, by a controller, a data page to be stored in a persistent storage of a deduplication storage system, wherein the data page includes a plurality of data blocks;
determining, by the controller, whether the data page includes a leading zero pad;
in response to a determination that the data page includes the leading zero pad, performing, by the controller, a circular shift of the plurality of data blocks to generate a realigned data page that begins at a non-zero value portion;
generating, by the controller, a fingerprint for the realigned data page;
comparing, by the controller, the generated fingerprint to a plurality of fingerprints included in metadata of the deduplication storage system; and
in response to a determination that no matches are found between the generated fingerprint and the plurality of fingerprints included in the metadata, storing, by the controller, the realigned data page and the generated fingerprint in the persistent storage.

10. The method of claim 9, further comprising:
generating a reference to the data page; and
storing the reference in the metadata of the deduplication storage system.

11. The method of claim 10, further comprising:
storing, in the reference to the data page, a pointer to the realigned data page stored in the persistent storage; and
storing, in the reference to the data page, an offset based on a length of the leading zero pad.

12. The method of claim 11, further comprising:
receiving a read request for the data page;
reading the pointer and the offset stored in the reference to the data page;
reading, using the pointer, the realigned data page from the persistent storage;
performing, using the offset, a reverse circular shift of the realigned data page to generate a copy of the data page; and
returning the copy of data page in response to the read request.

13. The method of claim 10, further comprising:
in response to a determination that a match is found between the generated fingerprint and a stored fingerprint included in the persistent storage:
storing, in the reference to the data page, a pointer to an existing copy of the data page stored in the persistent storage; and
storing, in the reference to the data page, a null offset value.

14. The method of claim 9, further comprising:
receiving a second data page to be stored in the persistent storage;
in response to a determination that the second data page does not include a leading zero pad:
generating a second fingerprint for the second data page;
comparing the second fingerprint to the plurality of fingerprints stored in the persistent storage;
in response to a determination that no matches are found between the second fingerprint and the plurality of fingerprints, storing the second data page and the second fingerprint in the persistent storage;
generating a second reference to the second data page stored in the persistent storage;
storing, in the second reference, a pointer to the second data page stored in the persistent storage; and
storing, in the second reference, a null offset value.

15. A non-transitory machine-readable medium storing instructions that upon execution cause a processor to:
receive a data page to be stored in a persistent storage of a deduplication storage system, wherein the data page includes a plurality of data blocks;
determine whether the data page includes a leading zero pad;
in response to a determination that the data page includes the leading zero pad, perform a circular shift of the plurality of data blocks to generate a realigned data page that begins at a non-zero value portion;
generate a fingerprint for the realigned data page;
compare the generated fingerprint to a plurality of fingerprints included in metadata of the deduplication storage system; and
in response to a determination that no matches are found between the generated fingerprint and the plurality of fingerprints included in the metadata, store the realigned data page and the generated fingerprint in the persistent storage.

16. The non-transitory machine-readable medium of claim 15, including instructions executable by the processor to:
generate a reference to the data page; and
store the reference in the metadata of the deduplication storage system.

17. The non-transitory machine-readable medium of claim 16, including instructions executable by the processor to:
store, in the reference to the data page, a pointer to the realigned data page stored in the persistent storage; and
store, in the reference to the data page, an offset based on a length of the leading zero pad.

18. The non-transitory machine-readable medium of claim 17, including instructions executable by the processor to:
receive a read request for the data page;
read the pointer and the offset stored in the reference to the data page;
read, using the pointer, the realigned data page from the persistent storage;
perform, using the offset, a reverse circular shift of the realigned data page to generate a copy of the data page; and
return the copy of the data page in response to the read request.

19. The non-transitory machine-readable medium of claim 16, including instructions executable by the processor to:
in response to a determination that a match is found between the generated fingerprint and a stored fingerprint included in the persistent storage:
store, in the reference to the data page, a pointer to an existing copy of the data page stored in the persistent storage; and
store, in the reference to the data page, a null offset value.

20. The non-transitory machine-readable medium of claim 15, including instructions executable by the processor to:
receive a second data page to be stored in the persistent storage;

in response to a determination that the second data page does not include a leading zero pad:
  generate a second fingerprint for the second data page;
  compare the second fingerprint to the plurality of fingerprints stored in the persistent storage;
  in response to a determination that no matches are found between the second fingerprint and the plurality of fingerprints, store the second data page and the second fingerprint in the persistent storage;
  generate a second reference to the second data page stored in the persistent storage;
  store, in the second reference, a pointer to the second data page stored in the persistent storage; and
store, in the second reference, a null offset value.

* * * * *